US012641100B2

(12) United States Patent  
Akella et al.

(10) Patent No.: US 12,641,100 B2  
(45) Date of Patent: May 26, 2026

(54) SYSTEMS AND METHODS FOR ANOMALY DETECTION

(71) Applicant: Netskope, Inc., Santa Clara, CA (US)

(72) Inventors: Srinivas Akella, San Jose, CA (US); Shahab Sheikh-Bahaei, Atherton, CA (US)

(73) Assignee: NETSKOPE, INC., Santa Clara, CA (US)

( * ) Notice: Subject to any disclaimer, the term of this patent is extended or adjusted under 35 U.S.C. 154(b) by 182 days.

(21) Appl. No.: 18/488,683

(22) Filed: Oct. 17, 2023

(65) Prior Publication Data

US 2024/0048581 A1 Feb. 8, 2024

Related U.S. Application Data

(63) Continuation of application No. 16/892,182, filed on Jun. 3, 2020, now Pat. No. 11,831,664.

(51) Int. Cl.  
*H04L 9/40* (2022.01)  
*G06F 16/245* (2019.01)  
*G06F 16/28* (2019.01)

(52) U.S. Cl.  
CPC ........ *H04L 63/1425* (2013.01); *G06F 16/245* (2019.01); *G06F 16/285* (2019.01); *H04L 63/1416* (2013.01)

(58) Field of Classification Search  
CPC . H04L 63/14; H04L 63/1416; H04L 63/1425; G06F 16/245; G06F 16/285  
See application file for complete search history.

(56) References Cited

U.S. PATENT DOCUMENTS

| | | | | |
|---|---|---|---|---|
| 10,956,779 | B2 * | 3/2021 | Urmanov | G06F 15/76 |
| 11,831,664 | B2 * | 11/2023 | Akella | H04L 63/1416 |
| 2008/0256230 | A1 * | 10/2008 | Handley | H04L 63/145 |
| | | | | 709/224 |
| 2014/0351934 | A1 * | 11/2014 | Mitra | G06F 21/567 |
| | | | | 726/23 |
| 2018/0130071 | A1 * | 5/2018 | Yao | G06Q 30/0185 |
| 2019/0012351 | A1 * | 1/2019 | Maor | G06F 21/00 |
| 2020/0104509 | A1 * | 4/2020 | Furuichi | H04L 63/1433 |
| 2021/0067450 | A1 * | 3/2021 | Hanes | H04L 47/283 |
| 2021/0203673 | A1 * | 7/2021 | dos Santos | H04L 63/1408 |

* cited by examiner

*Primary Examiner* — Jeong S Park  
(74) *Attorney, Agent, or Firm* — David R. Stevens; Stevens Law Group

(57) ABSTRACT

Computer network anomaly detection systems and methods are disclosed. One embodiment includes retrieving one or more learned profiles for a group of networked computing devices included in a computer network from a database. For each pair of computing devices in the group, a pairwise distance matrix may be computed. Each pairwise distance in the pairwise distance matrix is computed based on a statistical data profile associated with each computing device in each pair of computing devices from the group. The statistical data profiles may be included in the learned profiles. Any pairwise distances that are greater than a threshold may be removed from the pairwise distance matrix to generate a reduced pairwise distance matrix. One or more computing devices associated with the remaining pairwise distances in the reduced pairwise distance matrix may be sorted into a cluster of computing devices. An anomaly score may be computed for the cluster.

11 Claims, 13 Drawing Sheets

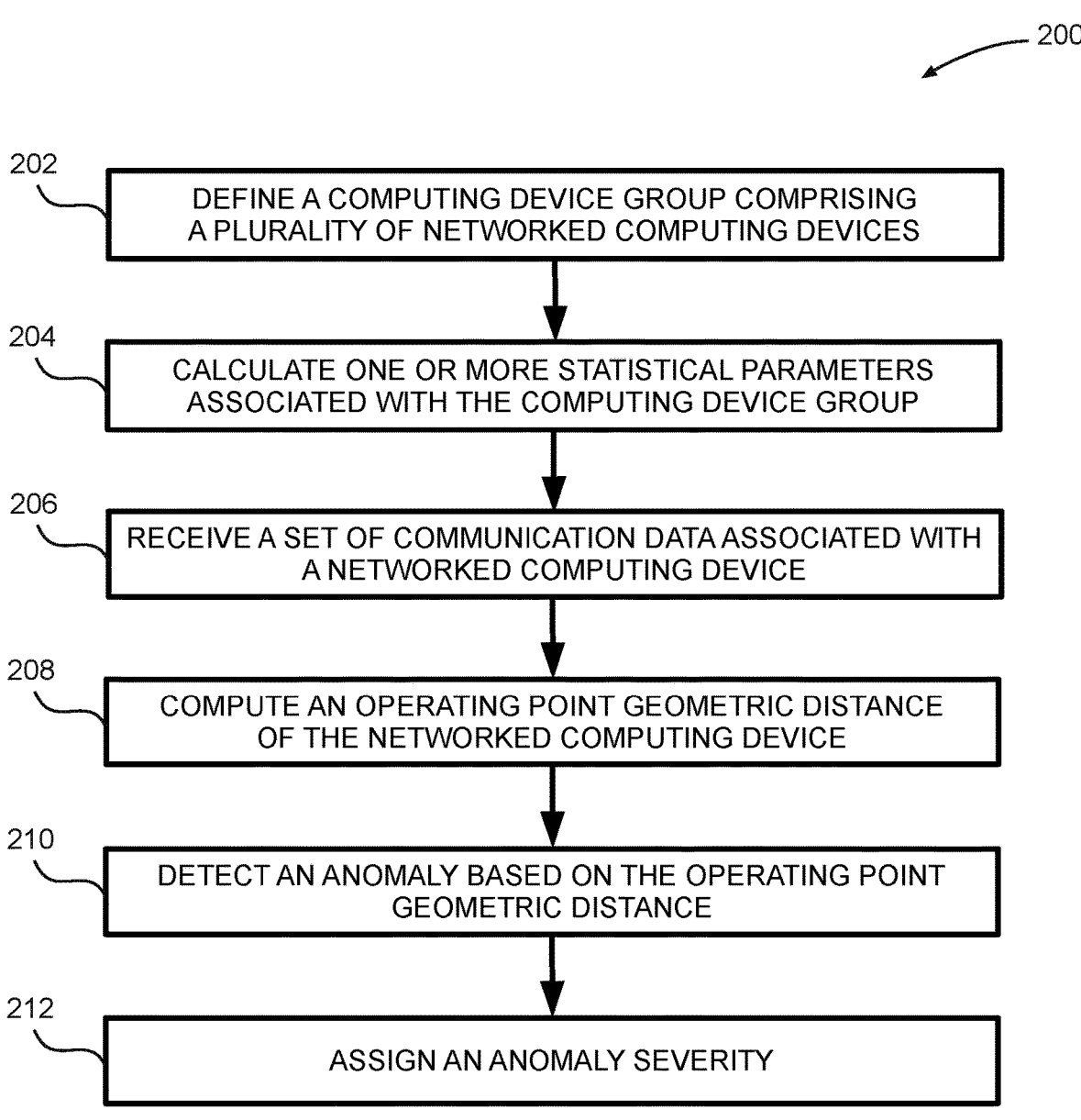

200

202
DEFINE A COMPUTING DEVICE GROUP COMPRISING
A PLURALITY OF NETWORKED COMPUTING DEVICES

204
CALCULATE ONE OR MORE STATISTICAL PARAMETERS
ASSOCIATED WITH THE COMPUTING DEVICE GROUP

206
RECEIVE A SET OF COMMUNICATION DATA ASSOCIATED WITH
A NETWORKED COMPUTING DEVICE

208
COMPUTE AN OPERATING POINT GEOMETRIC DISTANCE
OF THE NETWORKED COMPUTING DEVICE

210
DETECT AN ANOMALY BASED ON THE OPERATING POINT
GEOMETRIC DISTANCE

212
ASSIGN AN ANOMALY SEVERITY

FIG. 2

ANOMALY DETECTION MODULE — 314

STATISTICAL PARAMETER ESTIMATOR
402

COMMUNICATION DATA ANALYZER
404

GROUP SORTING MODULE
406

GEOMETRIC DISTANCE CALCULATOR
408

ANOMALY DETECTOR
410

ANOMALY CLASSIFIER
412

TAG ANALYZER
414

TIME CLUSTERING MODULE
416

HYPER CONTEXT ANALYZER
418

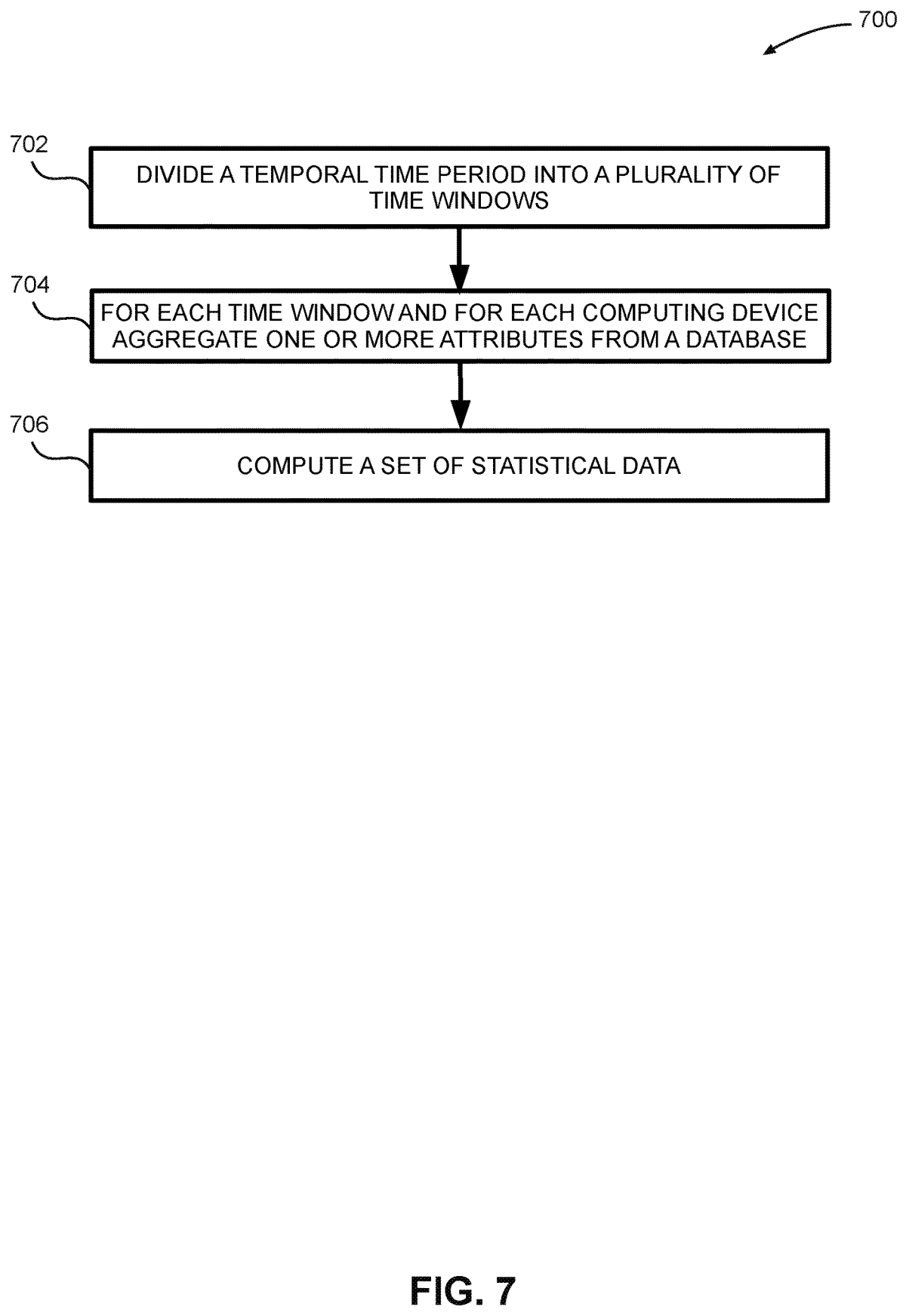

700

702

DIVIDE A TEMPORAL TIME PERIOD INTO A PLURALITY OF TIME WINDOWS

704

FOR EACH TIME WINDOW AND FOR EACH COMPUTING DEVICE AGGREGATE ONE OR MORE ATTRIBUTES FROM A DATABASE

706

COMPUTE A SET OF STATISTICAL DATA

FIG. 7

$$
\begin{array}{c}
\begin{array}{ccccccc}
\mathrm{C_1} & \mathrm{C_2} & \mathrm{C_3} & & \mathrm{C_{m-2}} & \mathrm{C_{m-1}} & \mathrm{C_m}
\end{array} \\
\begin{array}{c}
\mathrm{R_1} \\
\mathrm{R_2} \\
\mathrm{R_3} \\
\\
\mathrm{R_{m-2}} \\
\mathrm{R_{m-1}} \\
\mathrm{R_m}
\end{array}
\left[
\begin{array}{ccccccc}
0 & 5 & 3.87298335 & \ldots & 4 & 2.64575131 & 2.82842712 \\
5 & 0 & 3.74165739 & \ldots & 3.87298335 & 4.47213595 & 4.79583152 \\
3.87298335 & 3.74165739 & 0 & \ldots & 3.31662479 & 3.16227766 & 3.87298335 \\
\vdots & \vdots & \vdots & \ddots & \vdots & \vdots & \vdots \\
4 & 3.87298335 & 3.31662479 & \ldots & 0 & 3.60555128 & 4.24264069 \\
2.64575131 & 4.47213595 & 3.16227766 & \ldots & 3.60555128 & 0 & 2.64575131 \\
2.82842712 & 4.79583152 & 3.87298335 & \ldots & 4.24264069 & 2.64575131 & 0
\end{array}
\right]
\end{array}
$$

804
LOAD ONE OR MORE LEARNED PROFILES FOR
A GIVEN SET OF COMPUTING DEVICES

806
COMPUTE A PAIRWISE DISTANCE MATRIX

808
REMOVE DISTANCES THAT ARE GREATER THAN
A THRESHOLD FROM THE PAIRWISE DISTANCE MATRIX

810
CREATE A NETWORK BASED ON THE PAIRWISE DISTANCE
MATRIX AND FIND ONE OR MORE CLUSTERS
IN AN ASSOCIATED COMPUTER NETWORK

812
CALCULATE AN ANOMALY SCORE FOR EACH CLUSTER

900

902

READ DATA ASSOCIATED WITH A
COMPUTING DEVICE FROM A DATA STREAM

904

DETERMINE A GROUP ASSOCIATED WITH
THE COMPUTING DEVICE

906

GROUP NORMAL
VALUES KNOWN?

NO

YES

908

UPDATE NORMAL VALUES
FOR THE GROUP

910

ANOMALOUS
DEVICE DATA?

NO

YES

912

RAISE AN ALERT

1100

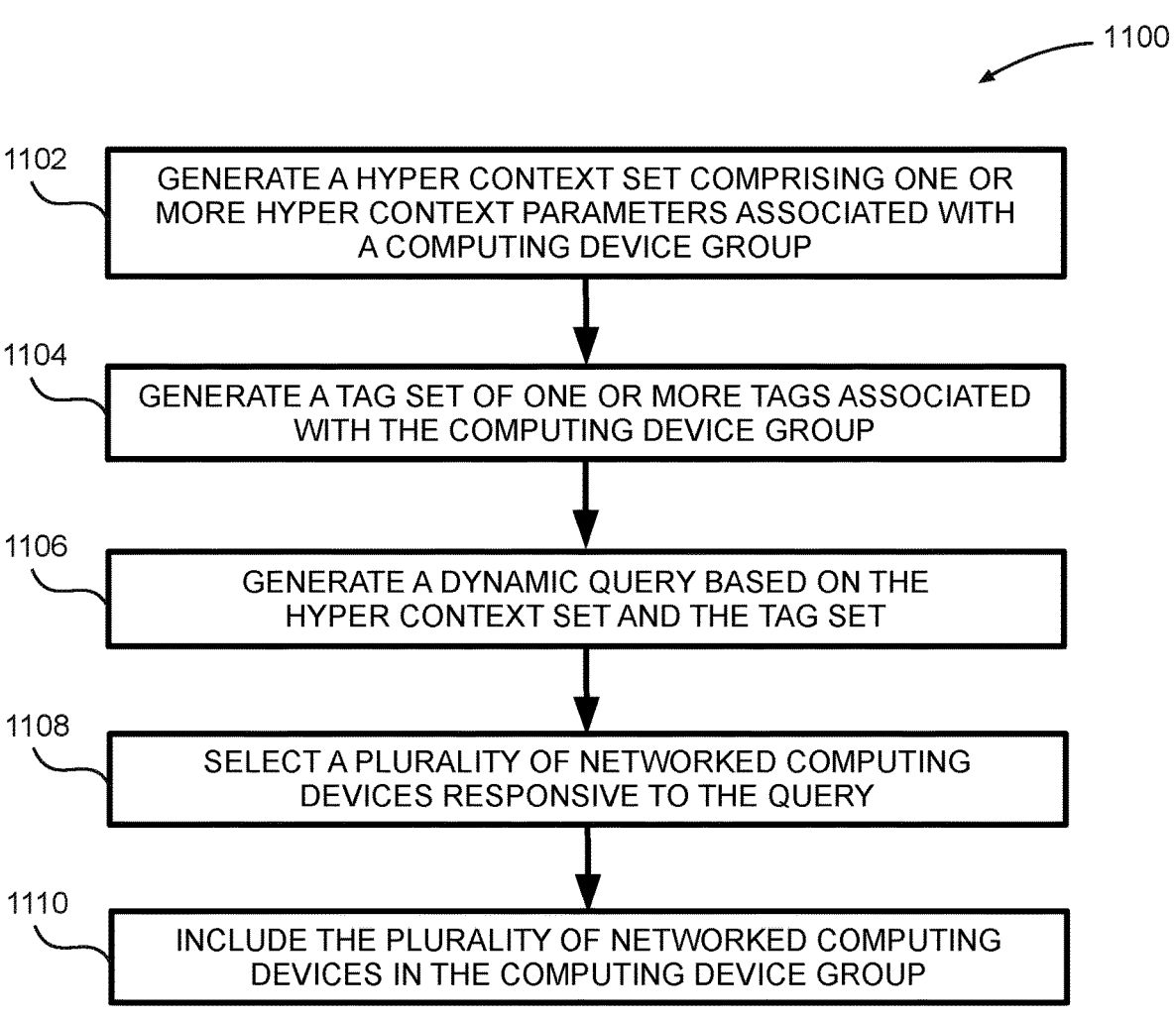

1102 GENERATE A HYPER CONTEXT SET COMPRISING ONE OR MORE HYPER CONTEXT PARAMETERS ASSOCIATED WITH A COMPUTING DEVICE GROUP

1104 GENERATE A TAG SET OF ONE OR MORE TAGS ASSOCIATED WITH THE COMPUTING DEVICE GROUP

1106 GENERATE A DYNAMIC QUERY BASED ON THE HYPER CONTEXT SET AND THE TAG SET

1108 SELECT A PLURALITY OF NETWORKED COMPUTING DEVICES RESPONSIVE TO THE QUERY

1110 INCLUDE THE PLURALITY OF NETWORKED COMPUTING DEVICES IN THE COMPUTING DEVICE GROUP

FIG. 11

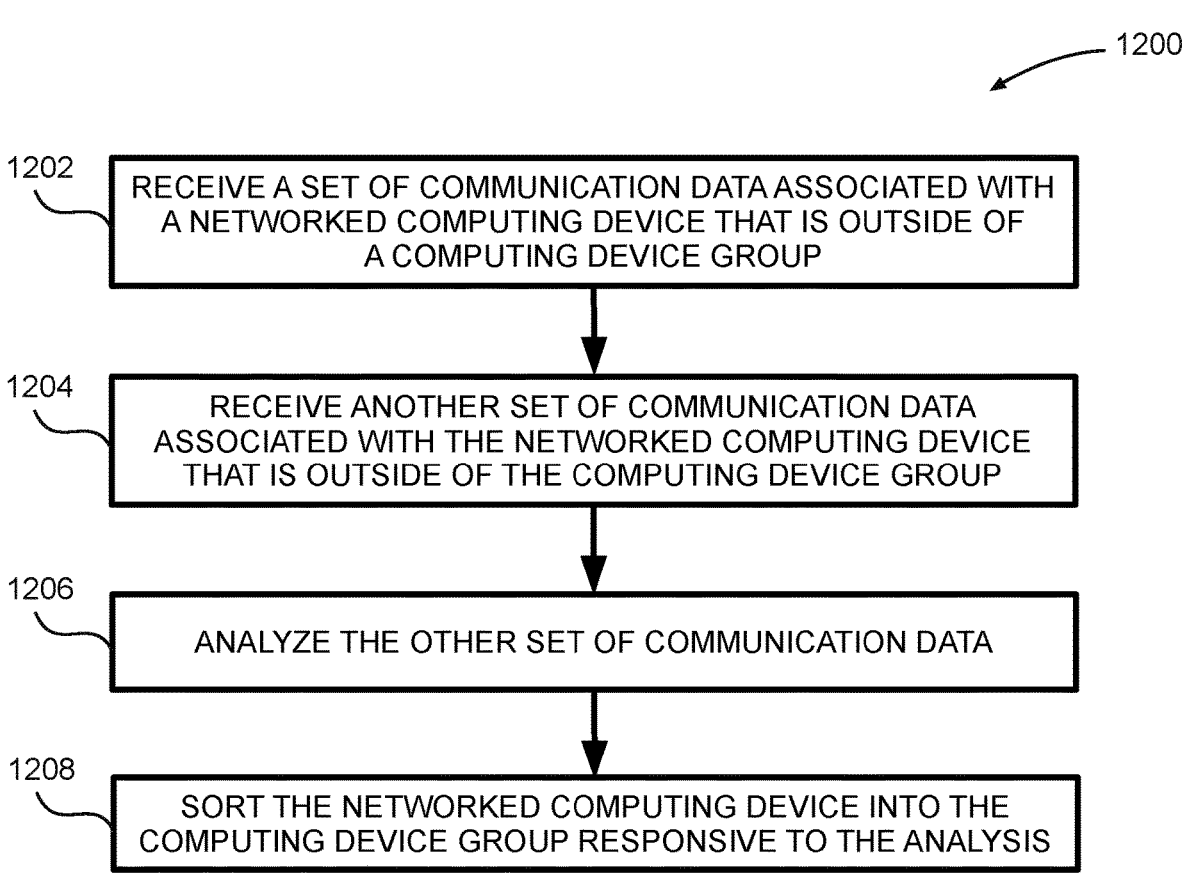

1200

1202 RECEIVE A SET OF COMMUNICATION DATA ASSOCIATED WITH A NETWORKED COMPUTING DEVICE THAT IS OUTSIDE OF A COMPUTING DEVICE GROUP

1204 RECEIVE ANOTHER SET OF COMMUNICATION DATA ASSOCIATED WITH THE NETWORKED COMPUTING DEVICE THAT IS OUTSIDE OF THE COMPUTING DEVICE GROUP

1206 ANALYZE THE OTHER SET OF COMMUNICATION DATA

1208 SORT THE NETWORKED COMPUTING DEVICE INTO THE COMPUTING DEVICE GROUP RESPONSIVE TO THE ANALYSIS

FIG. 12

SYSTEMS AND METHODS FOR ANOMALY DETECTION

CROSS-REFERENCE TO RELATED PATENT APPLICATION

The present disclosure is a continuation of U.S. patent application Ser. No. 16/892,182, filed on Jun. 3, 2020, which is hereby incorporated by reference in its entirety.

BACKGROUND

Technical Field

The present disclosure relates to systems and methods that detect anomalous behavior of a computing device associated with a computer network.

Background Art

Contemporary computer network implementations can include relatively large numbers of interconnected computing devices. For example, thousands or even millions of computing devices can be connected on and/or to the same computer network. In combination, techniques for executing network attacks continue to get increasingly sophisticated. Network attacks may be so sophisticated as to go undetected (at least for some amount of time). This combination of relatively large computer networks and increasingly sophisticated network attack techniques correspondingly increases computer network vulnerability. Each computing device included in a network is a potential attack point. Thus, the more computing devices included in a network the more vulnerable the network may be.

SUMMARY

Aspects of the invention are directed to systems, methods and computer program products for detecting anomalous computing device behavior in a computer network.

In one aspect, one or more statistical parameters associated with a group of networked computing devices are calculated. The group is associated with a computer network. Communication data associated with a networked computing device is received and analyzed. An operating point geometric distance of the networked computing device is computed relative to the one or more statistical parameters. An anomaly is detected and categorized based on the operating point geometric distance.

In another aspect, anomaly detection is performed for a networked computing device associated with a computer network. The computer network further includes and is connected to a network gateway. The network gateway is situated between the computer network and another computing system that is also connected to the network gateway.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2 is a flow diagram depicting example method for assigning an anomaly severity.

FIG. 7 is a flow diagram depicting an example method for computing a moving average and a standard deviation.

FIG. 8A depicts an example of a pairwise distance matrix.

FIG. 11 is a flow diagram depicting an example method for including a plurality of networked computing devices in a computing device group.

FIG. 12 is a flow diagram depicting an example method for sorting a networked computing device into a computing device group.

DETAILED DESCRIPTION

Figure 1A:
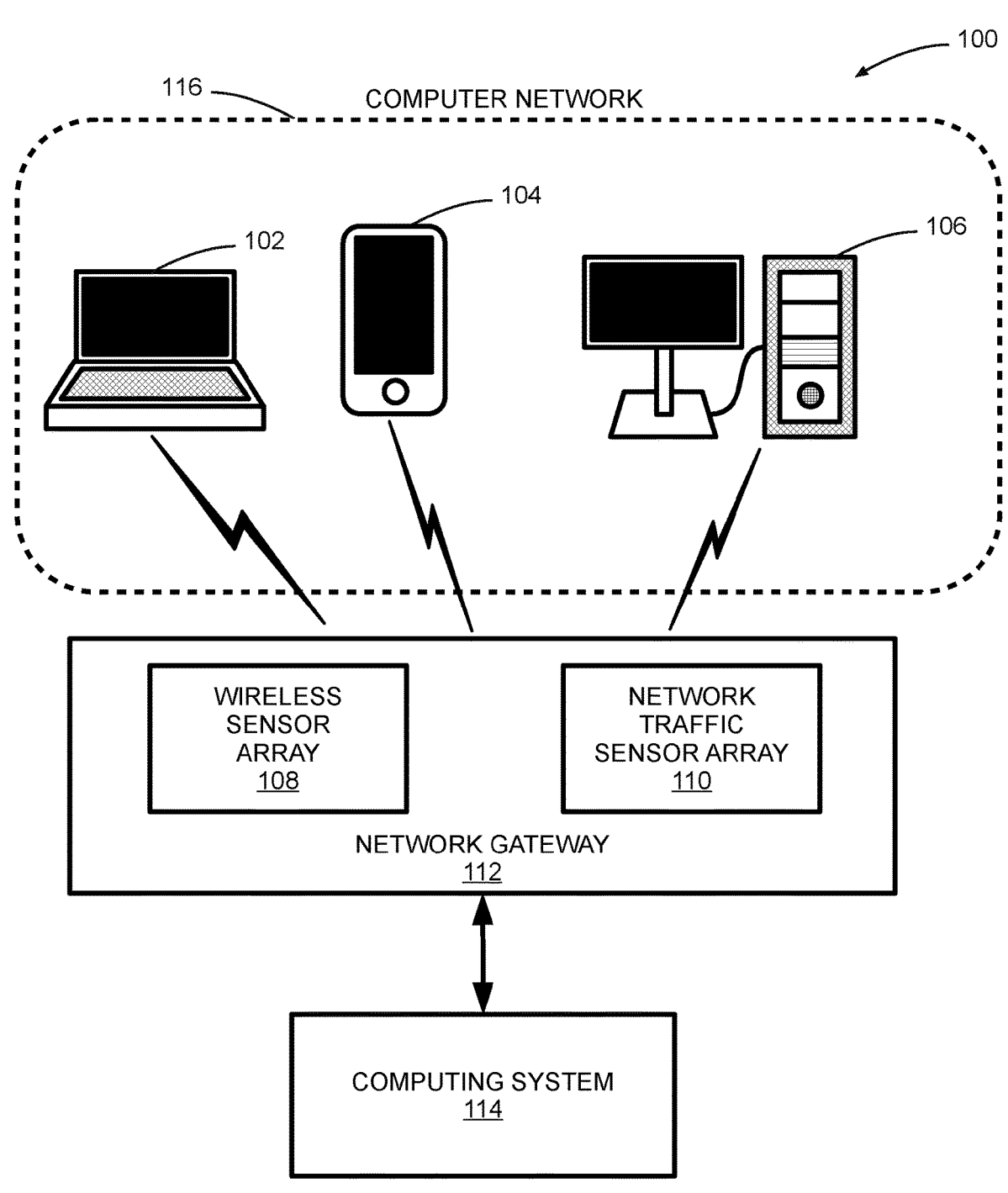
FIGS. 1A and 1B are block diagrams depicting example computer architectures of an anomaly detection system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Many current security systems deployed in computer networks are not able to detect nefarious activity caused by, for example, evasive malware. Isolating a specific computing device or a group of computing devices in a computer network that has been targeted by an attacker is a nontrivial problem.

Aspects of the invention described herein are configured to detect an anomaly associated with a computing device. A method for anomaly detection analyzes communication data associated with one or more computing devices in a computer network. In one aspect, a statistical parameter calculation approach is used to determine whether a computing device is exhibiting anomalous behavior.

FIG. 1A is a block diagram depicting an example computer architecture 100 of an anomaly detection system. As depicted, computer architecture 100 may include a computer network 116, a network gateway 112, and a computing system 114. Computer network 116 may further include a computing device 102, a computing device 104, a computing device 106, and other computing devices. In some aspects, network gateway 112 includes a wireless sensor array 108 and a network traffic sensor array 110.

In certain aspects, network gateway 112 is connected to computing system 114. Computing devices 102, 104, and 106 may communicate over computer network 116 and may be connected to network gateway 112 via any combination of wired or wireless connectivity protocols. Computing devices 102, 104, and 106 (and other computing devices included in computing network 116 and/or otherwise connected to network gateway 112) can include any combination of desktop computers, laptop computers, mobile devices such as tablets and cellular phones, internet-of-things (IoT) devices, or any other computing devices. In general, computer network 116 can include one or more internetworked computing devices. Within this description and the following claims, a "computing device" is defined as any device that includes at least a processor, system memory, and a network interface.

Computing devices 102, 104, and 106 can communicate over computer network 116 using any combination of wired or wireless communication protocols. For example, computing devices 102, 104, and 106 can use a wired communication protocol such as Ethernet. Computing devices 102, 104, and 106 can also use wireless communication protocols such as WiFi, Bluetooth, Bluetooth Low Energy (BLE), ZigBee, Long-Term Evolution (LTE), Lorawan, zwave, etc. Network gateway 112 receives network communication data from any of computing devices 102, 104, and 106, using wireless sensor array 108 and network traffic sensor array 110. Wireless sensor array 108 can be configured to transfer wireless network data using combinations of one or more wireless communication protocols. Network traffic sensor array 110 can be configured to transfer wired network data using combinations of one or more wired communication protocols.

In some embodiments, communication data associated with computing devices 102, 104, and 106 is collectively received by network gateway 112 and transmitted to computing system 114. Computing system 114 receives and analyzes the communication data. From the communication data analysis, computing system 114 can determine if one or more computing devices associated with computer network 116 exhibits anomalous behavior.

For example, consider a teleconferencing computing device in an organization's conference room. The teleconference computing device could typically be operated during "business hours", such as, between the hours of 8 am to 6 pm. Thus, detected operation of the teleconferencing computing device at 10 pm could be detected and flagged as anomalous. As another example, detecting an employee's personal mobile device logged in to a group of computing devices normally associated with corporate operations could be detected and flagged as anomalous.

Figure 1B:
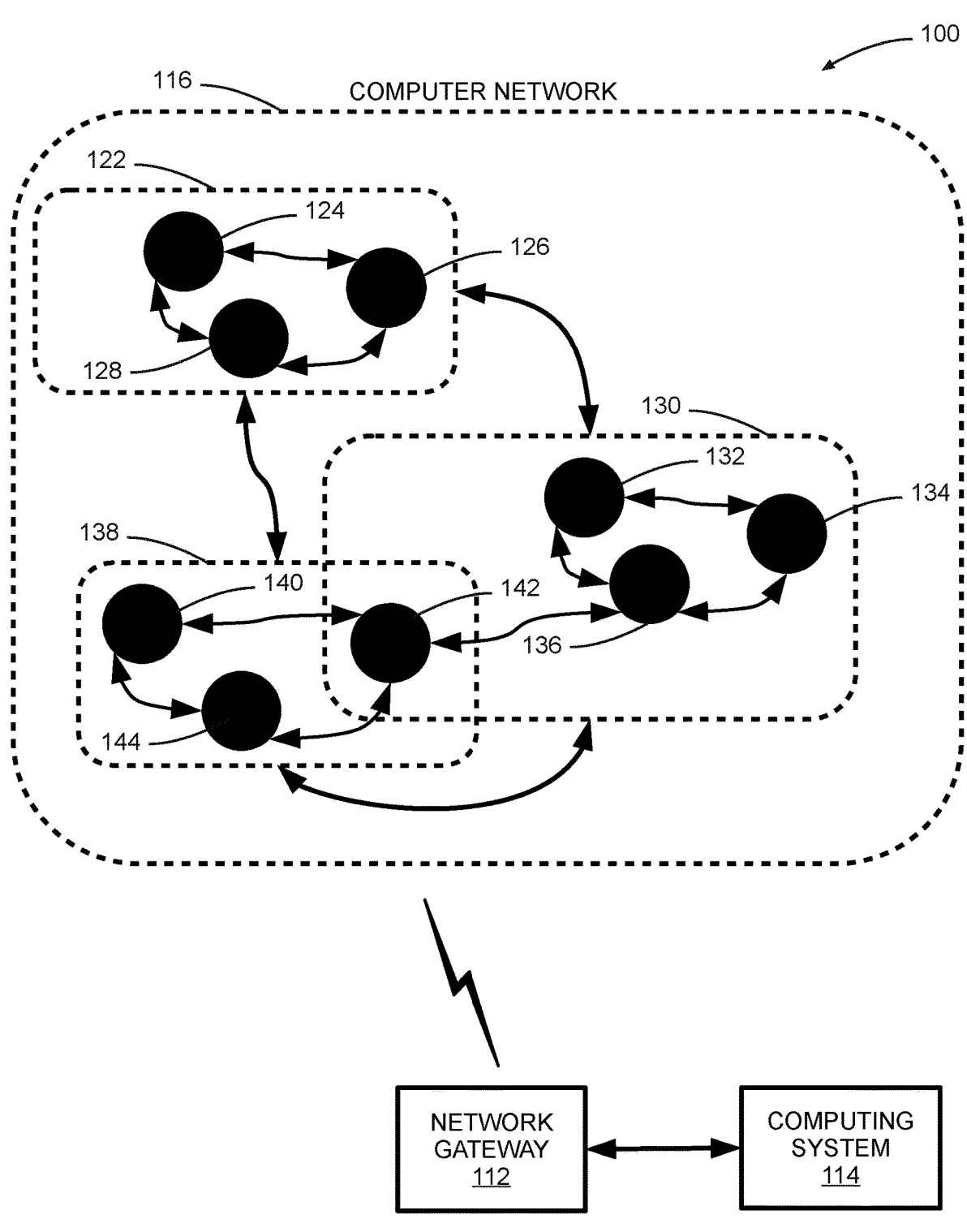

FIG. 1B is a is a block diagram depicting another view of example computer architecture 100. In FIG. 1B, computer network 116 includes a group 122, a group 130, and a group 138. Group 122 includes an interconnected set of computing devices 124, 126, and 128. Group 130 includes an interconnected set of computing devices 132, 134, and 136. Group 138 includes an interconnected set of computing devices 140, 142, and 144. As such, each of groups 122, 130, and 138 is a group of interconnected computing devices. Other computing devices, such as, 102, 104, or 106, may not be associated with a group.

As depicted, a computing device may belong to multiple groups and may be interconnected with one or more computing devices in each group. For example, computing device 142 belongs to group 130 and group 138, and is interconnected with computing devices 140, 144, and 136. In general, a group may be communicatively coupled to one or more other groups via one or more of the associated computing devices.

A group may be defined as a group of computing devices in a common organization of performing similar functions. Examples of groups include an information technology (IT) group, a human resources (HR) group, an operations group, etc. Computer network 116 may be associated with an organization such as a company or a business that includes one or more departments (or subdivisions), and each group may correspond to a set of computing devices operating in a specific department or subdivision (e.g., human resources).

The computing devices in each group (also referred to as "networked computing devices") are configured to communicate with each other, and each group in computer network 116 is configured to communicate with the other groups in computer network 116.

In an aspect, network gateway 112 is configured to receive communication data from computer network 116 and transmit this communication data to computing system 114. This communication data may be communication data associated with any combination of computing devices and/or groups included in computer network 116. Computing system 114 receives and analyzes the communication data. Computing system 114 can perform an anomaly detection on the communication data to determine if one or more computing devices or groups associated with computer network 116 exhibits anomalous behavior.

FIG. 2 is a flow diagram depicting example method 200 for assigning an anomaly severity. In some embodiments, method 200 may be implemented using computing system 114, and the anomaly detection may be performed on one or more computing devices or groups of computing devices included in a computer network such as computer network 116.

In one aspect, method 200 includes defining a computing device group comprising a plurality of networked computing devices associated with a computer network (202). For example, computing system 114 can define computing device group, such as, group 122 including computing devices 124, 126, and 128.

Method 200 includes calculating one or more statistical parameters associated with the computing device group (204). For example, computing system 114 can calculate the one or more statistical parameters associated with group 122 from, and in response to receiving, communication data via network gateway 112. The communication data may be associated with one or more computing devices (e.g., computing device 102 and/or computing device 124), or one or more groups (e.g., group 122 and/or group 130). Statistical parameters may include one or more of an average, weighted average, a mean, a variance, a standard deviation, an average of squares, a moving average, and other statistical parameters. In an aspect, the calculation process associated with the one or more statistical parameters is also referred to as "learning" or "profiling." Essentially, at 204, the statistical parameter calculation enables computing system 114 to profile the group. Computing system also learns the statistical parameters associated with the group.

Method 200 includes receiving a set of communication data associated with a networked computing device (206). For example, computing system 114 can receive additional communication data via network gateway 112. The additional communication data can be associated with a computing device included in computer network 116 (e.g., computing device 102, 124, 136, 140, 142, etc.).

Method 200 includes computing an operating point geometric distance of the networked computing device relative to the one or more statistical parameters (208). For example, computing system 114 can compute an operating point geometric distance of computing device 102 relative to the one or more statistical parameters. In some aspects, the operating point geometric distance is calculated based at least in part on the (additional) set of communication data. The statistical parameters may include a mean, a variance, and other statistical parameters associated with the group as described earlier. Details of these statistical parameters are described below. These statistical parameters define general operating conditions of the group while taking into account how the computing devices in the group normally function. This operating point geometric distance may be mathematically computed as a Euclidean distance, a Mahalanobis distance, or any other point-to-point distance.

Method 200 includes detecting an anomaly based on the operating point geometric distance (210). For example, computing system 114 can detect an anomaly based on the calculated operating point geometric distance of computing device 102. In one aspect, computing system 114 calculates an anomaly score associated with computing device 102. Computing system 114 can also compute other anomaly related parameters including: Count of Attribute Anomaly (CAA), Count of Common Anomaly (CCA) and Total Anomaly Count.

In an aspect, a weighted average is calculated as follows. Given $avg_1$ (a weighted average of $n_1$ numbers) and $avg_2$ (a weighted average of n 2 numbers), an overall weighted average of $n_1$ and $n_2$ numbers can be used as a basis for defining the statistical parameters as follows.

Statistical Parameters:

$$avg_c(avg_1, sumW_1, avg_2, sumW_2) = \frac{sumW_1 \times avg_1 + sumW_2 \times avg_2}{sumW_1 + sumW2}$$

where $$sumW = \Sigma e^{-ft_i}$$

is a sum of weights.

In the above equations, f is a forget-factor ($f \geq 0$) and $t_i$ is an age of an event. The older an event is, the lower the weight becomes for that event. The forget-factor determines how early events are ignored (forgotten). A higher forget-factor indicates earlier exclusion of events.

A weighted standard deviation is calculated using a combined variance:

$$var_c = avgOfSquares - avg_c^2$$

where:

$$avgOfSquares = avg_c(var_1 + avg_1^2, sumW_1, var_2 + avg_2^2, sumW_2)$$

A combined standard deviation (std) is calculated as a square root of a combined variance. A variance combinator function is defined as:

$$\text{var}_c(avg_1, sumW_1, var_1, avg_2, sumW_2, var_2) = avgOfSquares - avg_c^2$$

An anomaly score is calculated as:

$$AnomalyScore = \frac{ObservedValue - AverageValue}{StandardDeviation}$$

Method 200 includes assigning an anomaly severity (212). For example, computing system 114 can classify a detected anomaly based on an anomaly severity selected from among: low, medium, or high.

The anomaly score calculated above (i.e., AnomalyScore) indicates how many standard-deviations the anomaly is from an average value, which is an indication of a significance of deviation from an associated norm. By using preset thresholds, one can assign low, medium or high severity. For example, low, medium, or high thresholds may be 2, 5, or 10, respectively. In one aspect, an AnomalyScore between 2 and 5 is low, one between 5 and 10 is medium, and above 10 is high.

Any other learning algorithm may be used for detecting anomaly in a group as follows.

A learning algorithm may be trained on historic data such that it models and predicts an expected group behavior. An AnomalyScore for an observed value is calculated based on how much it differs from a predicted (i.e., expected) group behavior.

For example, "calculating weighted average" is a learning algorithm that can predict an expected behavior for the group. If an observed value is far from an expected average, that value is classified as an anomaly. Similarly, a more sophisticated algorithm, such as DNN (Deep Neural Networks), SVM (Support Vector Machines), can be used to model the expected behavior; AnomalyScore in a general case can be calculated as:

$$AnomalyScore = \frac{Observed\ Value - Predicted\ Value}{Normalizing\ Factor}$$

where Normalizing Factor>0 is a value to normalize anomaly scores, e.g. standard deviation.

Data features used for anomaly calculation may include a combination of: number of connections, number of packets sent/received, number of bytes sent/received, number of destination IP/ports, and so on.

Figure 3:
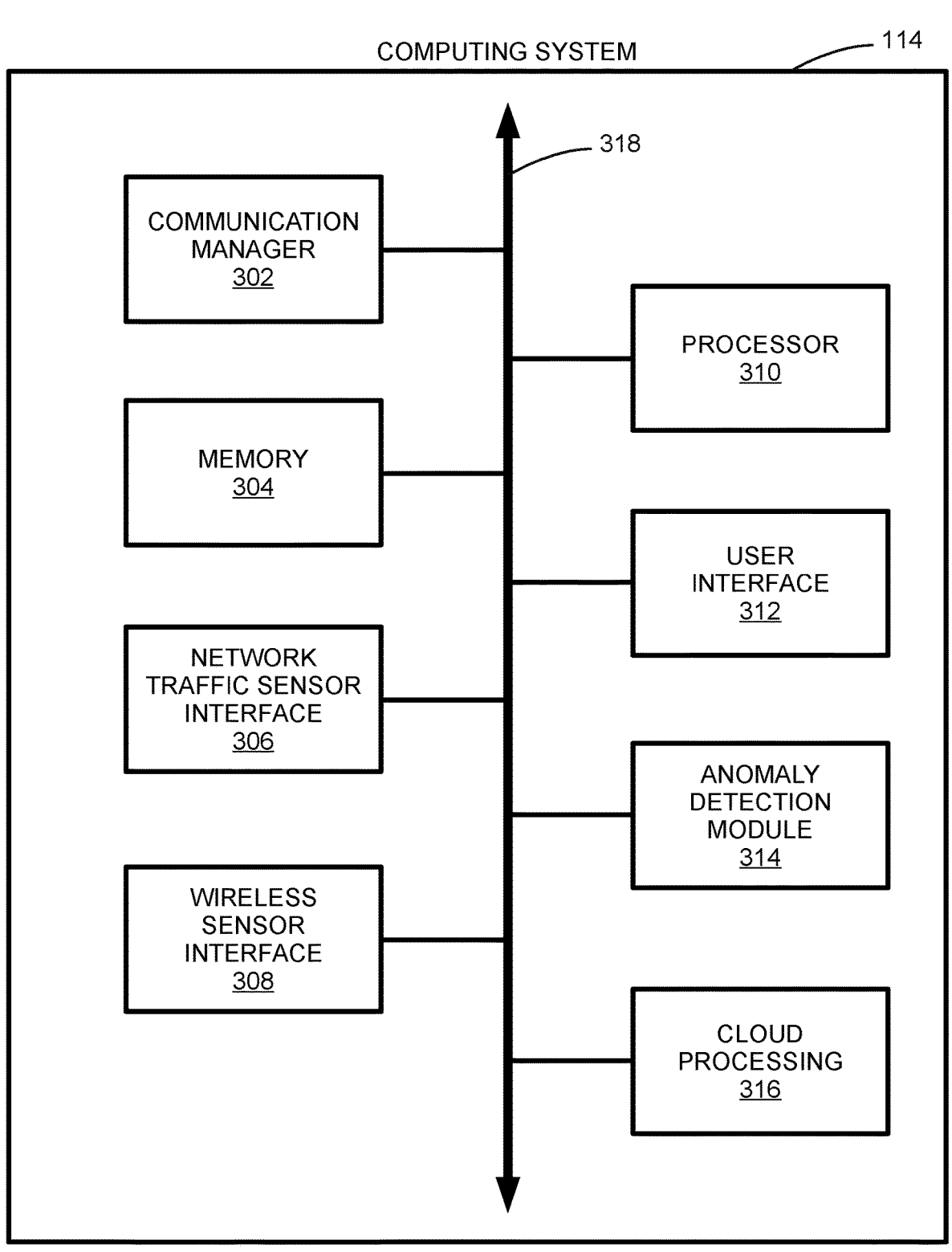
FIG. 3 depicts an example architecture of a computing system.

FIG. 3 depicts an example architecture of computing system 114. As described, computing system 114 may perform functions associated with method 200. As depicted, computing system 114 includes communication manager 302, memory 304, network traffic sensor interface 306, wireless sensor interface 308, processor 310, user interface 312, threat analysis module 314, cloud processing 316, and data bus 318.

Communication manager 302 can be configured to manage communication protocols and associated communication with external peripheral devices as well as communication with other components in computing system 114. For example, communication manager 302 may be responsible for generating and maintaining a communication interface between computing system 114 and network gateway 112.

Memory 304 is configured to store data associated with the anomaly detection applications described herein. Memory 304 may include both long-term memory and short-term memory. Memory 304 may be comprised of any combination of hard disk drives, flash memory, random access memory, read-only memory, solid state drives, and other memory components.

Network traffic sensor interface 306 enables computing system 114 to interface and communicate with network traffic sensor array 110. Wireless sensor interface 308 enables computing system to interface and communicate with wireless sensor array 108.

Processor 310 is configured to perform functions that may include generalized processing functions, arithmetic functions, and so on. Processor 310 is configured to process information associated with the systems and methods described herein.

User interface 312 allows a user to interact with aspects of the invention described herein. User interface 312 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Anomaly detection module 314 is configured to perform operations related to anomaly detection, as described.

Aspects of the invention may include cloud computing, where certain functions associated with risk assessment are computed on cloud servers. Cloud processing 316 can be configured to facilitate cloud based operations.

Data bus 318 communicatively couples the different components of computing system 114, and allows data and communication messages to be exchanged between these different components.

Figure 4:
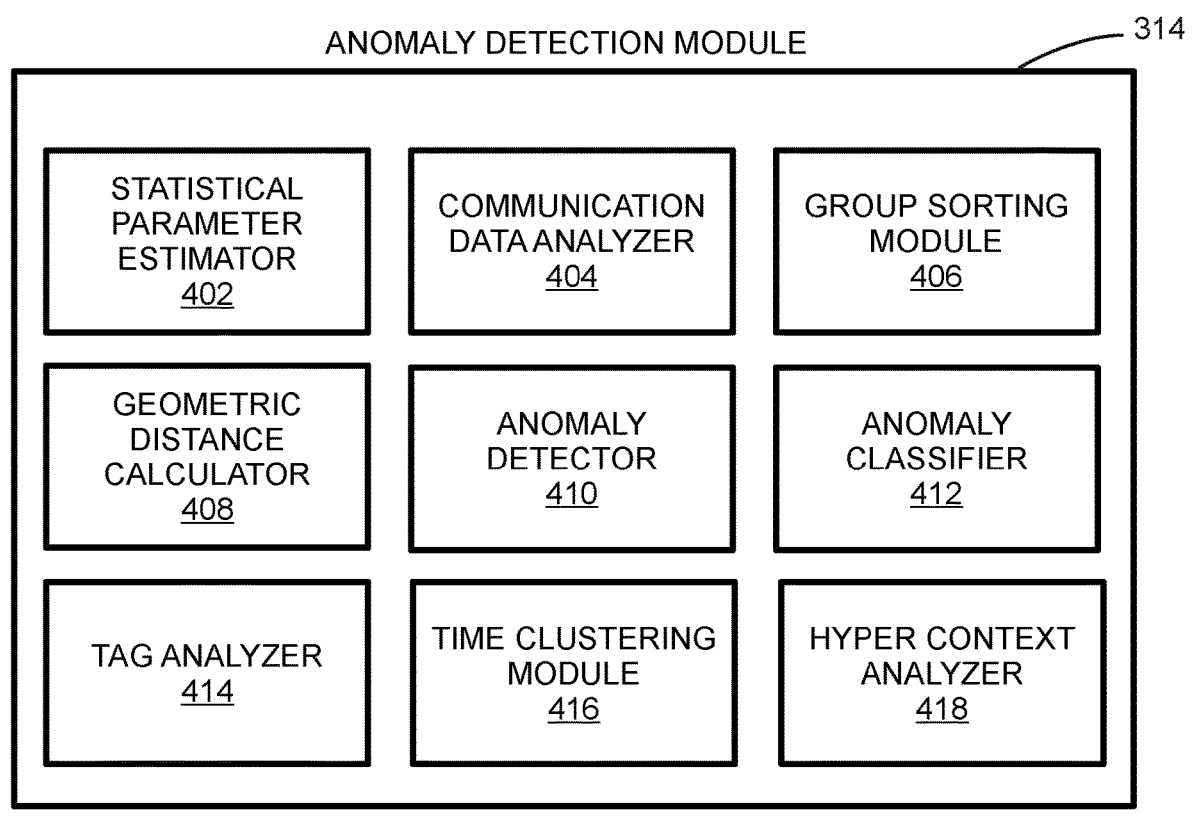
FIG. 4 depicts an example architecture of an anomaly detection module.

FIG. 4 depicts an example architecture of anomaly detection module 314. As depicted, anomaly detection module 314 includes a statistical parameter estimator 402, a communication analyzer 404, a group sorting module 406, a geometric distance calculator 408, an anomaly detector 410, an anomaly classifier 412, a tag analyzer 414, a time clustering module 416, and a hyper context analyzer 418.

Statistical parameter estimator 402 may be configured to calculate one or more statistical parameters associated with a computing device group. Statistical parameter estimator 402 may be configured to perform functions associated with act 206.

Communication data analyzer 404 may be configured to analyze communication data associated with a networked computing device responsive to receiving a set of communication data associated with the networked computing device in act 206.

Group sorting module 406 may be configured to sort a networked computing device (i.e., include a computing device) into a group such as group 122. Group sorting module 406 may be involved in a process to create a group of networked computing devices. Details about this process are described herein.

Geometric distance calculator 408 may be configured to determine an operating point geometric distance associated with a networked computing device. In an aspect, geometric distance calculator 408 may be configured to implement act 208.

Anomaly detector 410 may be configured to perform an anomaly detection associated with a networked computing device. Anomaly detector 410 may be configured to implement act 210. Anomaly detector 410 may also be configured to detect one or more anomalies associated with a group of computing devices (e.g., group 122).

In some aspects, after anomaly detector 410 detects an anomaly, anomaly classifier 412 may classify an associated anomaly severity as any one of low, medium or high. Anomaly detector 410 may be configured to implement act 212.

In some aspects, a user may label a networked computing device using one or more tags. Tag analyzer 414 may be configured to analyze the tags to facilitate sorting the networked computing device into a group by group sorting module 406.

Time clustering module 416 may be configured to perform a time clustering on communication data associated with a computing device or a group of computing devices, as described herein.

Hyper context analyzer 418 may be configured to analyze a hyper context associated with a networked computing device to facilitate sorting the networked computing device into a group by group sorting module 406. In certain aspects, defining a hyper context associated with a network computing device includes collecting one or more contexts pertaining to physical, logical, functional, organizational, location, traffic patterns, risks assessments, audits, alerts etc. associated with the networked computing device. Example contexts include:

Physical interfaces of a device with the spectrum of operation for each interface associated with the networked computing device, Type and category of the networked computing device, Operating system, patch level, services, and applications running on the networked computing device, Functionality or the "purpose in life" of the networked computing device, Microlocation of the networked computing device, including its mobility patterns and times of visibility, Ownership information of the networked computing device, and Control information (automatic vs user-controlled) associated with the networked computing device.

Figure 5:
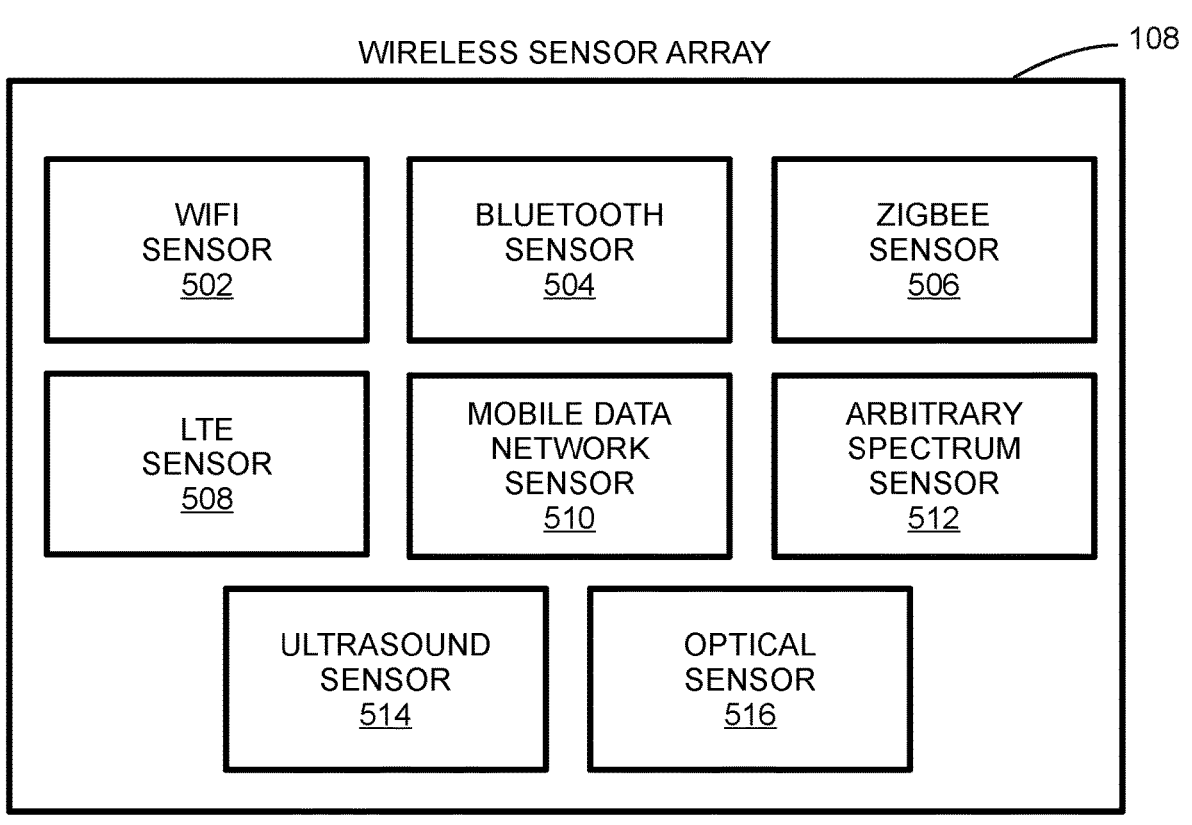
FIG. 5 depicts an example architecture of a wireless sensor array.

FIG. 5 depicts an example architecture of wireless sensor array 108. As depicted, wireless sensor array includes WiFi sensor 502, Bluetooth sensor 504, Zigbee sensor 506, LTE sensor 508, mobile data network sensor 510, arbitrary spectrum sensor 512, ultrasound sensor 514, and optical sensor 516.

Wireless sensor array 108 can be configured to scan a physical area in a vicinity of a computer network, such as, for example, computer network 116, Wireless sensor array 108 can detect any RF spectrum signals associated with the area and any non-RF wireless signals associated with the area. Wireless sensor array can also detect and receive any data communication packets associated with the RF signals and the non-RF wireless signals. Essentially, wireless sensor array 108 scans the RF and other spectrum to determine any existing RF communication signals and/or any non-RF wireless communication signals being used by computing devices, such as, for example, by 102, 104, 106, 124, 134, or 142.

WiFi sensor 502 can be configured to detect and receive any WiFi communication packets being used for communication, for example, by computing devices 102, 104, 106, 124, 134, or 142 over the associated communication network, for example, computer network 116. In some embodiments, WiFi sensor 502 is a WiFi packet sniffer.

Bluetooth sensor 504 can be configured to detect and receive any Bluetooth communication packets being used for communication, for example, by computing devices 102, 104, 106, 124, 134, or 142, via one or more peer-to-peer Bluetooth communication links. In some embodiments, Bluetooth sensor 504 is a Bluetooth packet sniffer.

ZigBee sensor 506 can be configured to detect and receive any ZigBee communication packets being used for communication by, for example, computing devices 102, 104, 106, 124, 134, or 142 via a ZigBee communication link. In some embodiments, ZigBee sensor 506 is a ZigBee packet sniffer.

LTE sensor 508 can be configured to detect long term evolution (LTE) signals being used for communication, for example, by computing devices 102, 104, 106, 124, 134, or 142.

Mobile data network sensor 510 can be configured to detect communication, for example, by computing devices 102, 104, 106, 124, 134, or 142, via other mobile data communication techniques, such as, General Packet Radio Service (GPRS), 3G, 3G+4G, 4G+5G, Global System for Mobile Communications (GSM), Universal Mobile Telecommunications Service (UMTS), and so on.

Arbitrary spectrum sensor 512 can be configured to detect and receive RF communication data associated with any arbitrary RF communication protocol used by, for example, computing devices 102, 104, 106, 124, 134, or 142.

In addition to sensors configured to detect RF communication signals, wireless sensor array 108 can include components capable of detecting non-RF wireless signals, such as, ultrasound communication signals and optical communication signals. More specifically, ultrasound sensor 514 can be configured to detect communication data associated with any ultrasonic (ultrasound) communication links used by, for example, computing devices 102, 104, or 106. Optical sensor 516 can be configured to detect communication data associated with any wireless optical data links used by, for example, computing devices 102, 104, 106, 124, 134, or 142.

Figure 6:
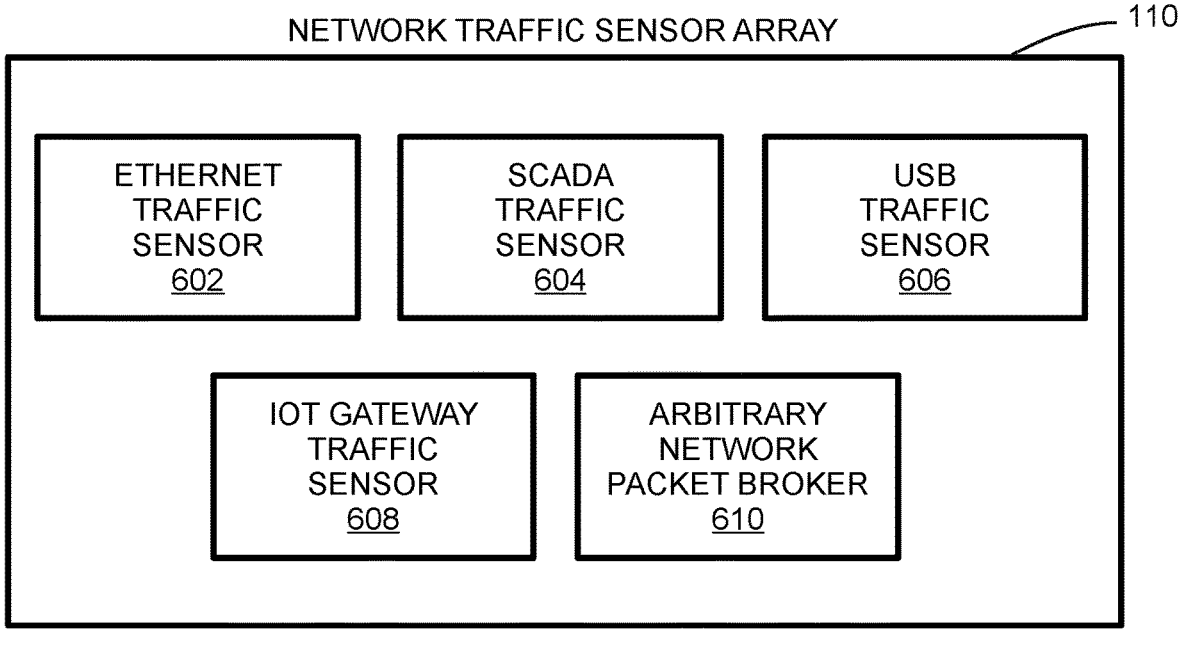
FIG. 6 depicts an example architecture of a network traffic sensor array.

FIG. 6 depicts an example architecture of a network traffic sensor array 110. As depicted, network sensor array 110 includes Ethernet traffic sensor 602, SCADA traffic sensor 604, USB traffic sensor 606, IoT gateway traffic sensor 608, and arbitrary network packet broker 610. In general, network traffic sensor array 110 can be configured to detect any network traffic-related communication data associated with computing devices, for example, 102, 104, 106, 124, 134, or 142, on a network, for example, computer network 116.

Ethernet traffic sensor 602 can be configured to detect, receive and process Ethernet traffic communication data associated with computing devices, for example, 102, 104, or 106. SCADA traffic sensor 604 can be configured to detect, receive and process SCADA communication data associated with computing devices, for example, 102, 104, or 106. USB traffic sensor 606 can be configured to detect, receive and process USB communication data associated with computing devices, for example, 102, 104, or 106.

IoT gateway traffic sensor 608 can be configured to detect, receive, and process communication data associated with Internet-of-Things (IoT) devices. Arbitrary network packet broker 610 can be configured to detect, receive and process arbitrary network packets received by network traffic sensor array 110.

FIG. 7 is a flow diagram depicting an example method 700 for computing a moving average and a standard deviation. Computing system 114 can be configured to implement 700.

In some aspects, method 700 divides a temporal time period into a plurality of time windows (702). For example, computing system 114 can divide a day into 24 time windows of 60-minutes each. Or, a week may be divided into 7 time windows of one day each (including weekdays and weekends). In an aspect, this division may be performed by computing system 114.

For each time window for each (networked) computing device, one or more attributes that may be stored in a database may be aggregated (704). For example, computing system 114 can aggregate attributes for database storage. Attributes can include bytes sent, bytes received, number of connections per protocol, etc. In an aspect, the database (not shown) is communicatively coupled to computing system 114. In another aspect, the attributes may be stored in memory 304.

In some aspects, a set of statistical data is computed (706). For example, computing system 114 can compute a set of statistics data. Computing system 114 can perform a computation, for each time window and for each attribute, for each networked computing device. Computer statistical data may include a moving average and a standard deviation, and may be used to construct a learned profile of an associated networked computing device.

In an aspect, method 700 represents a process of behavior profiling (i.e., learning) for a networked computing device. In general, a learning process may include the following for a set of internetworked computing devices:

i) Collect a data over a period of time and sort (categorize) the networked computing devices into their respective groups. A computing device may be dynamically sorted into a group based on its Hyper-Context, Tags, and other properties that match a group query. A device might belong to one or more groups. For example, if a computing device has a 'developer' tag, and a risk assessment of 56%, it matches a group defined as "Developer devices with risk >50%".

ii) Calculate the individual stats data for each device over the time period, where a networked computing device is identified using its MAC address. The statistics can be represented as:

$Avg_{mac1}$, $Avg_{mac2}$, $Avg_{mac3}$, $Avg_{mac4}$ . . . .

iii) Find the weighted average and standard deviation of the statistical data in each group:

$Avg_{grp}$ iv) Using the average as the center, find the distance of every point to the center (E.g., find a Euclidean distance as well as the individual statistical distance). The Euclidean distance is defined as:

$|d1|$, $|d2|$, $|d3|$, $|d4|$ . . . .

The point-to-point distance is defined as:

$d1$, $d2$, $d3$, $d4$ . . . .

v) Find the average and standard deviation of all the distances. The respective average and standard deviation corresponding to the Euclidean distance are denoted by:

$Avg_{|d|}$, $Std_{|d|}$

The respective average and standard deviation corresponding to the point-to-point measurement are denoted by:

$Avg_d$, $Std_d$

FIG. 8A depicts an example of a pairwise distance matrix 800. In an aspect, pairwise distance matrix 800 is a square matrix comprised of m rows and m columns. Pairwise distance matrix 800 may include rows $R_1$, $R_2$, $R_3$, . . . , $R_{m-2}$, $R_{m-1}$, $R_m$, and columns $C_1$, $C_2$, $C_3$, . . . , $C_{m-2}$, $C_{m-1}$, $C_m$. In one aspect, pairwise distance matrix 800 is associated with a group of m computing devices associated with, for example, computer network 116.

In an aspect, an element in the $i^{th}$ row and the $j^{th}$ column of pairwise distance matrix 800 may be denoted by $E_{ij}$. $E_{ij}$ is a distance between the $i^{th}$ and the $j^{th}$ computing device in the group. Hence, pairwise distance matrix 800 is a matrix comprised of distances between each pair of computing devices in the group. In one aspect, $E_{ij}$ is any of a Euclidean distance, a Mahalanobis distance, or a point-to-point distance. Also, $E_{ij}=E_{ji}\geq0$, $\forall i=1, 2, . . . , m$, $j=1, 2, . . . , m$. Furthermore, since the geometric distance of a computing device from itself is zero, $E_{ii}=0$, $\forall i=1, 2, . . . , m$. Hence, pairwise distance matrix 800 is a symmetric matrix with zeroes on the diagonal, and non-negative values elsewhere in pairwise distance matrix 800.

Figure 8B:
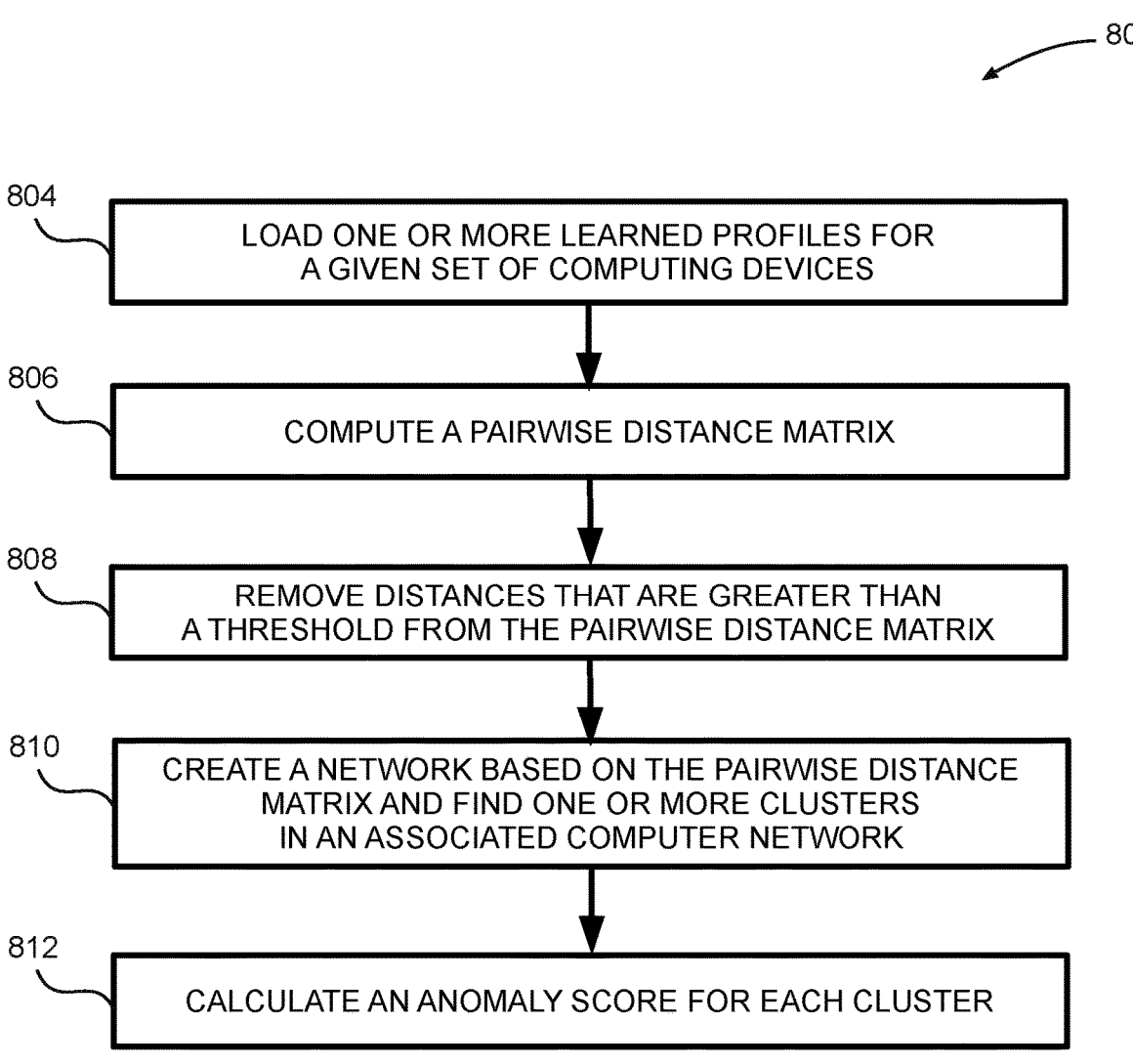
FIG. 8B is a flow diagram depicting an example method for calculating an anomaly score.

FIG. 8B is a flow diagram depicting an example method 802 for calculating an anomaly score. Computer system 114 can be configured to implement method 802.

Method 802 includes loading one or more learned profiles for a given set of computing devices (804). For example, computing system 114 can load one or more learned profiles for a given set of computing devices that includes computing devices 124, 126, and 128 in group 122, and computing device 140 not belonging to group 122. Computing system 114 can load the one or more learned profiles from a database or from storage in memory 304.

Method 802 includes computing a pairwise distance matrix (for example, pairwise distance matrix 800) that contains geometric distance measurements between each pair of computing devices in the set of computing devices (806). For example, computing system 114 can compute a pairwise distance matrix for group 122. The pairwise distance matrix can include geometric distance measurements between computing devices 124 and 126, computing devices 126 and 128, and computing devices 128 and 124. A geometric distance can be a Euclidean distance, a Mahalanobis distance, or a point-to-point distance.

Method 802 includes removing distances that are greater than a threshold from the pairwise distance matrix (808). For example, computing system 114 can remove distances from pairwise distance matrix 800 that exceed a threshold (e.g., 4.5). In the case of pairwise distance matrix 800, for a threshold of 4.5, elements $E_{12}=E_{21}=5$ and $E_{2m}=E_{m2}=4.79583152$ are removed. Removing distances exceeding the threshold results in clusters of computing devices within the group by disjoining computing devices that do not share general characteristics with other computing devices in the group (i.e., outliers). For example, a computing device belonging to a group of HR computing devices may be initially included in the pairwise distance matrix if it has had similar characteristics with the other computing devices belonging to the group at some point. At 808, this computing device can be excluded from the pairwise distance matrix if the pairwise distance of this computing device from the other computing devices in the group is greater than the threshold. This will indicate anomalous behavior within the group.

Method 802 includes creating a network based on the pairwise distance matrix and finding one or more clusters in an associated computer network (810). In some aspects, groups and clusters are defined as follows:

A group is a set of computing devices that are assigned to the same group based on a predetermined query using device hyper-context, static attributes, tags, etc. This assignment is dynamic. A computing device can belong to one or more groups. For example, a group, using query "developer devices with risk score >50%", can be created and maintained as described herein.

One or more computing devices in a group are automatically clustered using their behavior attributes such as number of connections, activity times, number of packets sent/received, etc. For example, consider multiple computing devices, denoted as A1-A6, belonging to a group of developers. After observing the individual behavior of each computing devices, the computing devices can be clustered as: {A1, A2, A3}, {A4, A5}, and {A6}, which means A6 is acting anomalously within the group. In addition to the algorithm disclosed above, there are several methods to calculate clusters such as Affinity Propagation, Agglomerative Clustering, BIRCH, DB SCAN, K-Means, Mini-Batch K-Means, Mean Shift, OPTICS, Spectral Clustering, Mixture of Gaussians, and so on. Essentially, clustering involves generating subsets of computing devices within a group of computing devices, and may be used to reveal any anomalies within the group.

In some aspects, computing system 114 (and more specifically clustering module 416) can create a network based on pairwise distance matrix 800 and finding one or more clusters in network 116. In some embodiments, the network is represented as a graph. In the computer network, a cluster is generated as a group of computing devices with similar operating characteristics, as described above.

In an aspect, a clustering process associated with 810 may be over a longer-term time period (e.g., several weeks), or over a shorter-term time period (e.g., 1 minute). For longer-term time clustering, learned behavior profiles of one or more computing devices are used. For shorter-term time clustering, computing device properties such as number of connections, number of bytes sent/received, number of destination IP addresses, number of destination ports during an associated time-window (e.g. 1-min) are used.

Method 802 includes calculating an anomaly score for each cluster (812). For example, computing system 114 can calculate an anomaly score for each cluster. In an aspect, anomaly scores are calculated using the formula:

$$clusteranomalyscore(x) = \frac{\frac{1}{n_c}}{\sum \frac{1}{n_i}}$$

where:
$n_c$=number of nodes in the same cluster with x
$n_i$=number of nodes in cluster i.

Figure 9:
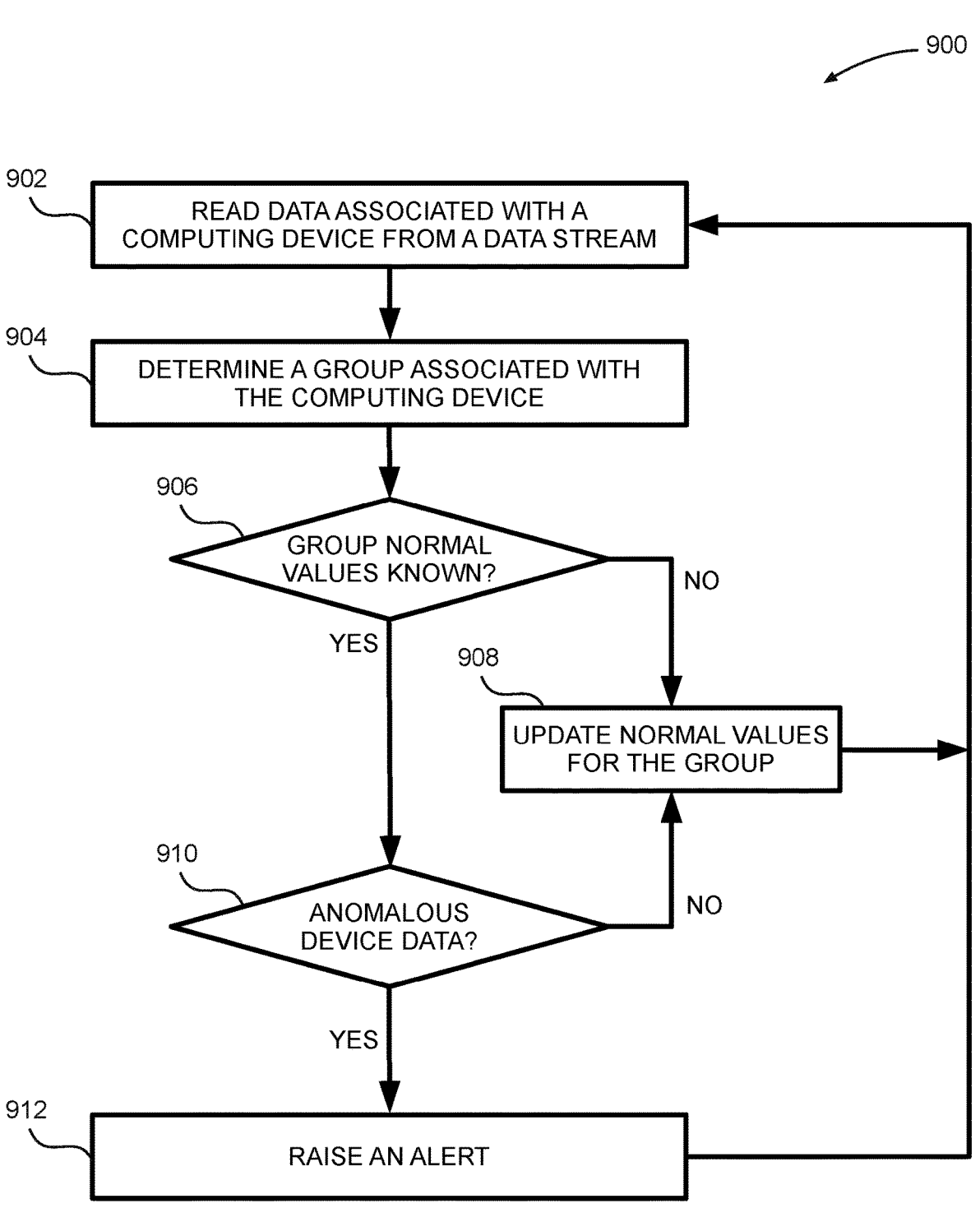
FIG. 9 is a flow diagram depicting an example method for determining a group associated with a computing device.

FIG. 9 is a flow diagram depicting an example method 900 for determining a group associated with a computing device. Computing system 114 can be configured to implement method 900.

Method 900 includes reading data associated with a computing device from a data stream (902). For example, computing system 114 can read data associated with a computing device from a data stream. In one aspect, computing system 114 receives the data stream via network gateway 112. The data stream may be associated with a computing device from computer network 116. and may include information such as number of connections, ports, IP addresses, etc.

Method 900 may include determining a group associated with the computing device (904). For example, computing system 114 can determine a group associated with the computing device based on data in the received data stream. Determining an associated group can include matching one or more computing devices with group query definitions in real time.

Method 900 may include checking to determine whether normal values associated with a group are known (906). For example, computing system 114 can check to determine whether normal values associated with group 122 are known. If the normal values associated with the group are not known, method 900 includes inferring that the basic parameters used to profile the group have not been learned. For example, computing system 114 can infer that the basic statistical parameters used to profile group 122 have not been learned yet. In some aspects, this may be observed when a new group is created/defined. Method 900 includes updating normal values for the group (908). This process is also known as incremental learning/profiling the group parameters. For example, computing system 114 can update normal values for group 122. Method 900 can then transition to 902.

On the other hand if, at 906, the group normal values are known, method 900 includes checking to determine if the data associated with the data stream is anomalous device data (910). For example, computing system 114 can check whether the data associated with the data stream is anomalous device data for computing device 124. If the data is not anomalous device data, method 900 transitions to 908. On the other hand, if the data is determined to be anomalous device data, method 900 includes raising an alert (912). For example, computing system 114 can raise an alert to a user of anomaly detection system 100 via user interface 312 Method 900 can then transition to 902.

Figure 10:
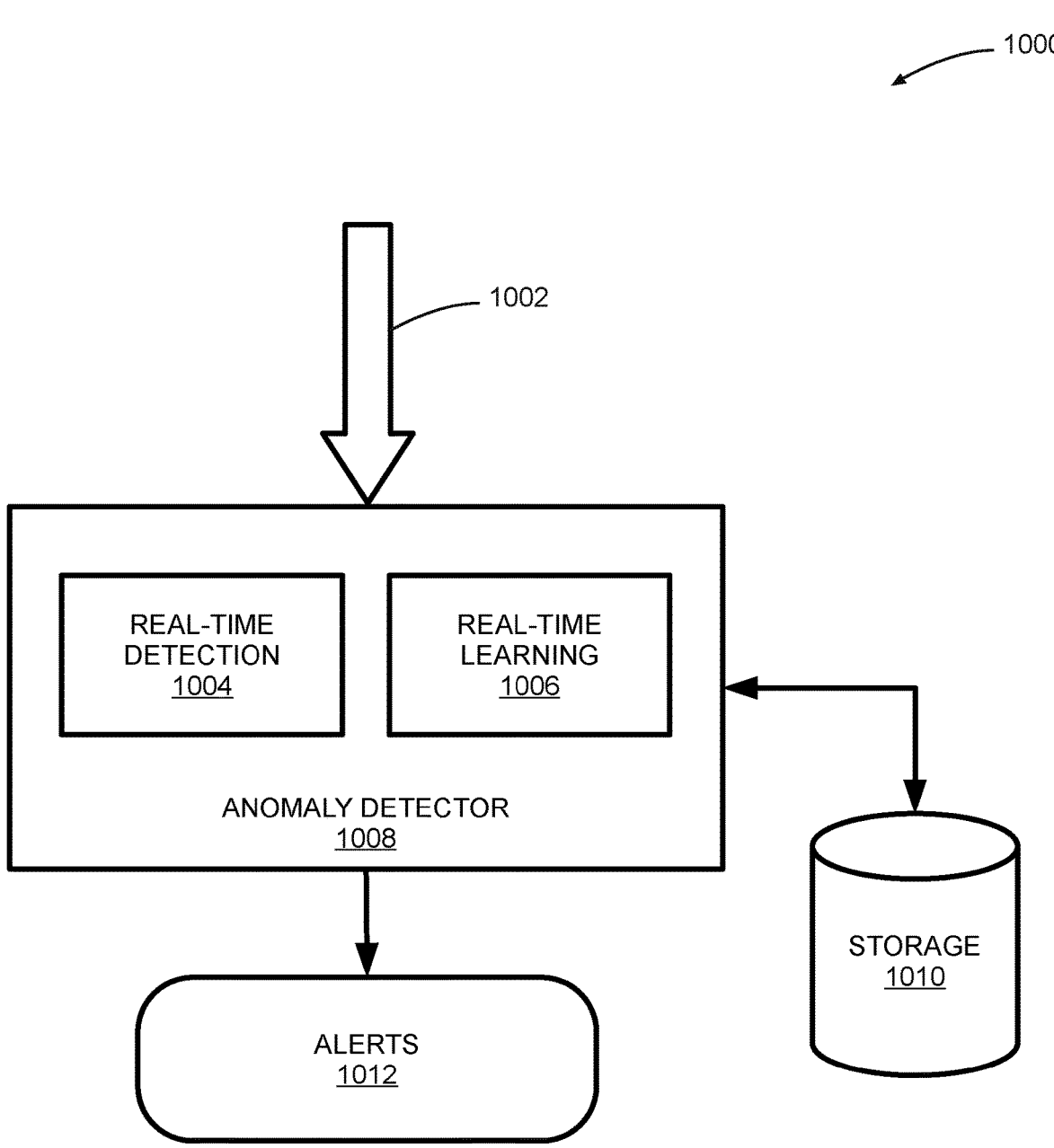
FIG. 10 depicts an example architecture of an anomaly alert generation system.

FIG. 10 depicts an example architecture 1000 of an anomaly alert generation system. As depicted, architecture 1000 includes an anomaly detector 1008 that further includes real-time detection 1004 and real-time learning 1006. Anomaly detector 1008 may be connected to a storage 1010. In an aspect, storage 1010 is a database that stores data associated with anomaly detection, such as, data values and statistics associated with a group of computing devices. Architecture 1000 may represent a conceptual embodiment of method 900, and may be implemented on computing system 114.

In an aspect, anomaly detector 1008 reads data from data stream 1002. Data stream 1002 might correspond to a computing device that is a part of a computer network, for example, computer network 116. Reading from a data stream can correspond to 902. Real-time detection 1004 can determine a group associated with the computing device based on data in data stream 1002. Real-time detection 1004 can also determine whether the group normal values are known (906). If the group normal values are known or if the data is not anomalous data (910), then real-time learning 1006 updates normal values for the group that are stored in storage 1010. On the other hand, if an anomaly is detected, then anomaly detector 1008 generates one or more alerts 1012 (912).

FIG. 11 is a flow diagram depicting an example method 1100 for including a plurality of networked computing devices in a computing device group. In an aspect, method 1100 represents an example sequence of operations used to implement 202.

Method 1100 includes generating a hyper context set comprising one or more hyper context parameters associated with a computing device group (1102). For example, computing system 114 may be configured to determine one or more hyper context parameters associated with group 122.

In an aspect, the computing device group is a group of networked computing devices that have a similar set of properties.

A hyper context can generally be defined as one or more properties associated with a computing device, such as:

A device type group (e.g., the computing device may perform a function of a network router or a network switch).

An operating system associated with the computing device (e.g., Windows, Linux, MacOS, etc.).

An operating system version associated with the computing device.

A risk score or a risk factor associated with the computing device.

A microlocation of the computing device (e.g., an estimated physical location of the computing device within a building or a campus).

An ownership associated with the computing device.

A control associated with the computing device.

In an aspect, the hyper context may be computed by computing system 114 based on data received from a computing device associated with computer network 116 or 120. In an aspect, this data is received via network gateway 112.

Method 1100 includes generating a tag set of one or more tags associated with the computing device group (1104). For example, computing system 114 can generate a tag set of one or more tags associated with group 122. In one aspect, a tag set is generated manually by a user of computer architecture 100. In another aspect, a tag set may be automatically generated by computing system 114. In yet another aspect, a tag set may be generated using a combination of user inputs and automation. Examples of tags include an operating system associated with the computing device, a group associated with the computing device (e.g., HR), and so on.

Method 1100 includes generating a dynamic query based on the hyper context set and the tag set (1106). For example, computing system 114 can generate a dynamic query based on the hyper context set and the tag set. In one aspect, computing system 114 processes the dynamic query. The results of the query may be a list of one or more computing devices that satisfy one or more conditions associated with the query.

Method 1100 includes selecting a plurality of networked computing devices responsive to the query (1108). For example, computing system 114 selects a plurality of networked computing devices 102 and 104, responsive to the query. Method 1100 includes further including the plurality of networked computing devices in the computing device group (1110). For example, computing system 114 includes the networked computing devices 102 and 104 in group 122.

Thus, method 1100 can be used to create and maintain a group of networked computing devices. A query may be used to create a group, and new computing devices may be added to the group using method 1100. Examples of groups that may be created and/or selected using method 1100 include:

User Windows Computers with risk>50%,

Auto devices in building A, level 2, and

Smart TVs running a Tizen operating system.

FIG. 12 is a flow diagram depicting an example method 1200 for sorting a networked computing device into a computing device group. In an aspect, method 1200 represents an example sequence of operations used to implement 206.

Method 1200 may include receiving a set of communication data associated with a networked computing device that is outside of a computing device group (1202). For example, computing system 114 can receive communication data associated with computing device 102 via network gateway 112. The computing device may be a part of computer network 116 but not included in any of groups 122, 130, or 138.

Method 1200 may include receiving another set of communication data associated with the networked computing device that is outside of the computing device group (1204). For example, computing system 114 may receive another set of communication data associated with computing device 102.

Method 1200 may include analyzing the other set of communication data (1206). For example, computing system 114 can analyze the other set of communication data.

Method 1200 may include sorting the networked computing device into the computing group responsive to the analysis (1208). For example, computing system 114 can sorting sort computing device 102 into group 122.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:

generating one or more learned profiles for a group of networked computing devices included in a computer network, the generating comprising:

collecting computer network data communicated by the computing devices over the computer network for a predetermined time period;

categorizing the computing devices into the group;

calculating individual statistical data for each computing device including an average and a standard deviation;

computing a weighted average and standard deviation for statistical data associated with the group;

using the weighted average and standard deviation for the group as a reference point, computing a distance of each average and standard deviation associated with each computing device from the reference point; and storing the learned profiles in a database;

retrieving, from the database, the one or more learned profiles;

computing, for each pair of computing devices in the group, a pairwise distance matrix, wherein each pairwise distance in the pairwise distance matrix is computed based on a statistical data profile associated with each computing device in each pair of computing devices from the group, and wherein the statistical data profiles are included in the learned profiles;

removing any pairwise distances that are greater than a threshold from the pairwise distance matrix to generate a reduced pairwise distance matrix;

clustering the computing devices associated with the remaining pairwise distances in the reduced pairwise distance matrix into a cluster of computing devices; and computing an anomaly score for the cluster.

2. The method of claim 1, wherein the clustering is associated with a predetermined time period.

3. The method of claim 2, wherein the time period is any of a plurality of weeks, a plurality of days, a plurality of hours, or a plurality of minutes.

4. The method of claim 1, wherein the clustering is based on computing device properties that include the learned profiles, a number of connections, a number of bytes sent or received, a number of destination IP addresses, and a number of destination ports during the time period.

5. The method of claim 1, wherein the threshold is determined and the clustering is performed based on one or more computing device characteristics and behavior attributes.

6. The method of claim 1, further comprising:
categorizing the computing devices into a plurality of clusters; and
computing an individual anomaly score for each cluster.

7. The method of claim 1, wherein the anomaly score is computed based on determining a number of computing system nodes in the cluster.

8. The method of claim 1, wherein each element in the pairwise distance matrix is any of a Euclidian distance, a Mahalanobis distance, or a point-to-point distance.

9. The method of claim 1, wherein the pairwise distance matrix is a symmetric matrix.

10. The method of claim 1, wherein membership of a computing device in the group is based on any combination of a common organization with other computing devices in the group, or a similar function to other computing devices in the group.

11. The method of claim 10, wherein is a group is any of an information technology (IT) group, a human resources (HR) group, or an operations group.

\* \* \* \* \*